United States Patent [19]
Bruchmann et al.

[11] Patent Number: 5,981,684
[45] Date of Patent: Nov. 9, 1999

[54] HIGHLY FUNCTIONALIZED POLYURETHANES

[75] Inventors: Bernd Bruchmann; Frank Wingerter, both of Ludwigshafen; Hermann Graf, Mutterstadt; Stefan Wolff, Limburgerhof, all of Germany

[73] Assignee: Basf Aktiengesellschaft, Ludwigshafen, Germany

[21] Appl. No.: 08/973,729

[22] PCT Filed: Jun. 21, 1996

[86] PCT No.: PCT/EP96/02705

§ 371 Date: Dec. 15, 1997

§ 102(e) Date: Dec. 15, 1997

[87] PCT Pub. No.: WO97/02304

PCT Pub. Date: Jan. 23, 1997

[30] Foreign Application Priority Data

Jul. 1, 1995 [DE] Germany ............................ 195 24 045

[51] Int. Cl.$^6$ ............................ C08G 18/81; C08G 18/00
[52] U.S. Cl. ................................ 528/45; 528/44; 528/61; 528/67; 528/69; 525/452; 525/453

[58] Field of Search .................................. 528/45, 44, 422, 528/59, 65, 67, 69, 64, 61; 525/452, 453

[56] References Cited

U.S. PATENT DOCUMENTS 5,041,516  8/1991  Frechet et al. ............................ 528/44

OTHER PUBLICATIONS

Two–step Approach towards the Accelerated Synthesis of Dendritic Macromolecules. Ralph Spindler and Jean M.J. Frechet. J Chem. Soc. Prekin Trans. I, Jan. 1993 (913–918).

Primary Examiner—James J. Seidleck
Assistant Examiner—Sanza L. McClendon
Attorney, Agent, or Firm—Keil & Weinkauf

[57] ABSTRACT

The invention relates to highly functionalized polyurethanes which are synthesized from molecules containing the functional groups $A(B)_n$, where A is an NCO group or a group reactive with an NCO group, B is an NCO group or a group reactive with an NCO group, A is reactive with B and n is a positive number and is at least equal to 2.

14 Claims, No Drawings

HIGHLY FUNCTIONALIZED POLYURETHANES

The invention relates to highly functional, highly branched poly-urethanes, their preparation, and monomers for the preparation of polyurethanes of this type.

Highly functionalized molecules, ie. dendrimers or arboroles, and highly branched polymers, also called hyperbranched polymers, have recently been attracting interest in chemistry and pharmacy.

Dendrimers are three-dimensional, highly ordered, highly branched oligomeric and polymeric compounds which, starting from small molecules, are formed by a continuously repeating reaction sequence. In this process, higher and higher branchings are formed, at the end of which in each case are functional groups which, in turn, are the starting point for further branchings.

A description of dendrimers is found in D. A. Tomalia, A. M. Naylor, W. A. Goddard III, Angew. Chem., 1990, 102, 119–157.

A highly branched polyurethane is described in R. Spindler, J. M. J. Fréchet, J. Chem Soc. Perkin Trans. I, 1993, 913.

The monomer used there has the structural formula

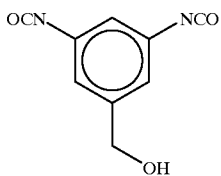

An isocyanate-terminated, highly branched polyurethane can be prepared from this monomer by a polyaddition reaction.

A problem in this case is the preparation of the monomer. The starting material used is a compound having the following structure:

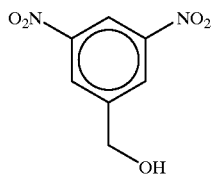

First, the hydroxyl group is blocked with tert-butyldiphenylsilyl chloride, and the nitro groups are converted by hydrogenation and subsequent phosgenation into isocyanate groups, which are blocked with phenol. To carry out the polyaddition reaction, the blocking agents are removed. Owing to the necessity of removing the phenol and the use of the very expensive tert-butyldiphenylsilyl chloride, the described preparation of the highly branched polyurethanes is uneconomical.

A. Kumar and S. Ramachrishnan, J. Chem. Soc., Chem. Commun. 1993, 1453, describe highly branched polyurethanes which are prepared from monomers of the following structure:

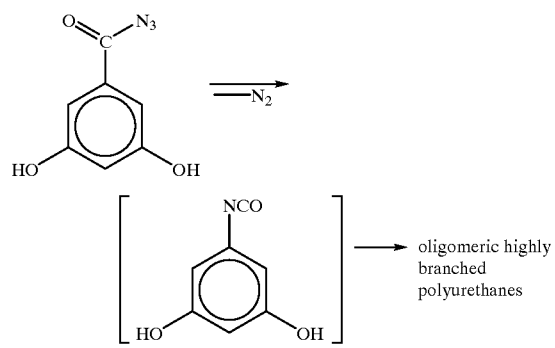

The acid azide eliminates nitrogen on warming and by rearrangement intermediately forms the isocyanate, which reacts further to give a hydroxyl-terminated polyurethane.

Here too, the starting monomer is difficult to prepare because acid azides decompose easily and in some cases with violent reactions, additionally the urethane group formed from isocyanate and phenolic hydroxyl group is thermally unstable.

It is an object of the present invention to provide highly branched and dendrimeric polyurethanes which can be reproducibly prepared from easily accessible monomers by simple process steps.

We have found that this object is achieved by reaction of monomers containing an NCO group and containing n groups reactive with NCO or a group reactive with NCO and n NCO groups, where groups reactive with NCO are, in particular, mercapto, but preferably amino or hydroxyl groups, and n is in the range from 2 to 5, in particular 2 to 4, and is particularly preferably equal to 2 to 3.

The difference between highly branched and dendrimeric polyurethanes is in that dendrimeric polyurethanes, starting from an initiator core, are built up like a shell in defined reaction stages (generations) and have a defined molar mass, highly branched polyurethanes, however, are built up irregularly and have a molar mass distribution.

These structural differences are intended to be illustrated in the following schematic representations:

Highly branched polyurethanes formed from $AB_2$ monomers:

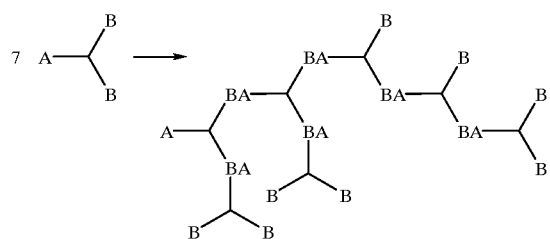

Polyurethane dendrimers formed from initiator core I and AB$_2$ monomers:

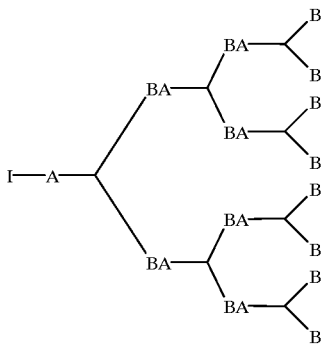

In this context, in the present case, A and B can be a hydroxyl or isocyanate group, BA a urethane group and I the initiator core. Depending on functionality, even more of the dendrimer branches shown can be attached to the initiator core I.

To prepare the compounds according to the invention, it is first necessary to prepare monomers of the type AB$_n$, where A and B are each an isocyanate group and an H-functional group reactive with it and n is a positive number $\geq 2$, in particular equal to 2 or 3.

By way of example, the preparation of an AB$_2$ monomer based on 2,4-toluylene diisocyanate (TDI) and trimethylolpropane will first be described.

First, one of the NCO groups of the TDI is capped in a manner known per se. This can be carried out, for example, by formation of a uretdione, reaction with an oxime, a phenol or another suitable able blocking agent. Based on the different reactivity of the two NCO groups, in the Case of 2,4-TDI the NCO group located in the 4-position is preferably blocked.

The free NCO group can be reacted with a compound containing at least 3 H-functional groups, for example trimethylolpropane, glycerol or an alkanolamine, such as diethanolamine.

After removing the capping agent, a molecule containing 2 hydroxyl groups and an NCO group results which, depending on the reaction procedure, can be reacted to give highly branched or dendrimeric polyurethanes.

In a similar manner, ie. by capping one part of the isocyanate groups and reacting the other part with compounds containing at least 3 H-functional groups, in principle all aliphatic and aromatic di- or polyisocyanates can be reacted to give monomers containing an NCO and at least 2 H-functional groups. Particularly suitable isocyanates are 2,4-toluylene diisocyanate (2,4-TDI), 2,6-toluylene diisocyanate (2,6-TDI), 2,4'-diphenylmethane diisocyanate (2,4'-MDI), 4,4'-diphenylmethane diisocyanate (4,4'-MDI), 1,5-naphthylene diisocyanate (NDI), 1,4-phenylene diisocyanate, 1,3-tetramethylxylylene diisocyanate (TMXDI), hydrogenated MDI (HMDI), isophorone diisocyanate (IPDI), hexamethylene-1,6-diisocyanate (HDI), 2-isocyanatopropylcyclohexyl- isocyanate (IPCI), 2-butyl-2-ethylpentaethylene diisocyanate (BEPDI), lysine diisocyanate (LDI), 1,12-dodecyl diisocyanate, cyclohexyl-1,3- or -1,4-diisocyanate and 2-methylpentamethylene diisocyanate (MPDI).

Conversely, it is also possible to prepare AB$_n$ monomers by capping at least one of the H-functional groups in a compound containing at least 2 H-functional groups and reacting the free H-functional groups with isocyanate groups.

In the case of polyfunctional alcohols, the capping can be carried out, for example, by acetal or ketal formation. For example, two hydroxyl groups of trimethylolpropane or glycerol can thus be capped by reaction with acetone and the free hydroxyl group reacted with an isocyanate group.

If a capped triol of this type is allowed to react with 2,4-toluylene diisocyanate (TDI) in which the NCO group located in the 4-position is blocked, eg. by formation of a uretdione or by reaction with an oxime, eg. acetone oxime, a monomer containing two hydroxyl groups and one blocked NCO group is obtained in high selectivity. The reaction is intended to be schematically represented using trimethylolpropane (TMP), acetone, 2,4-TDI and acetone oxime:

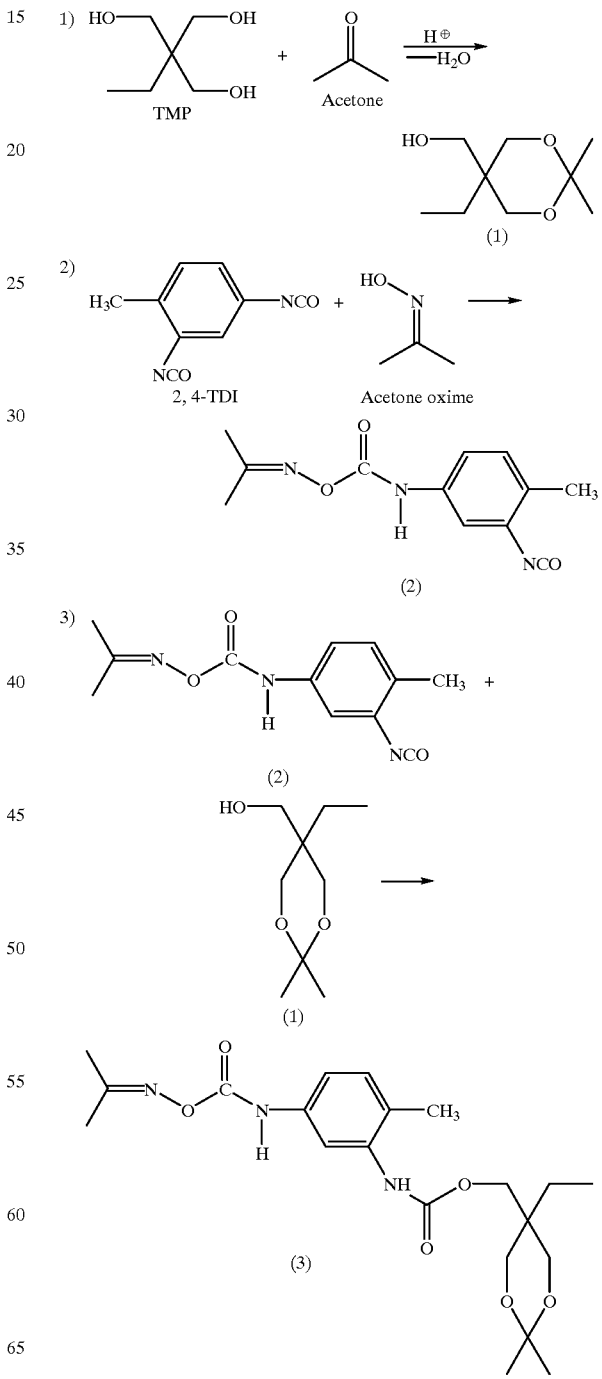

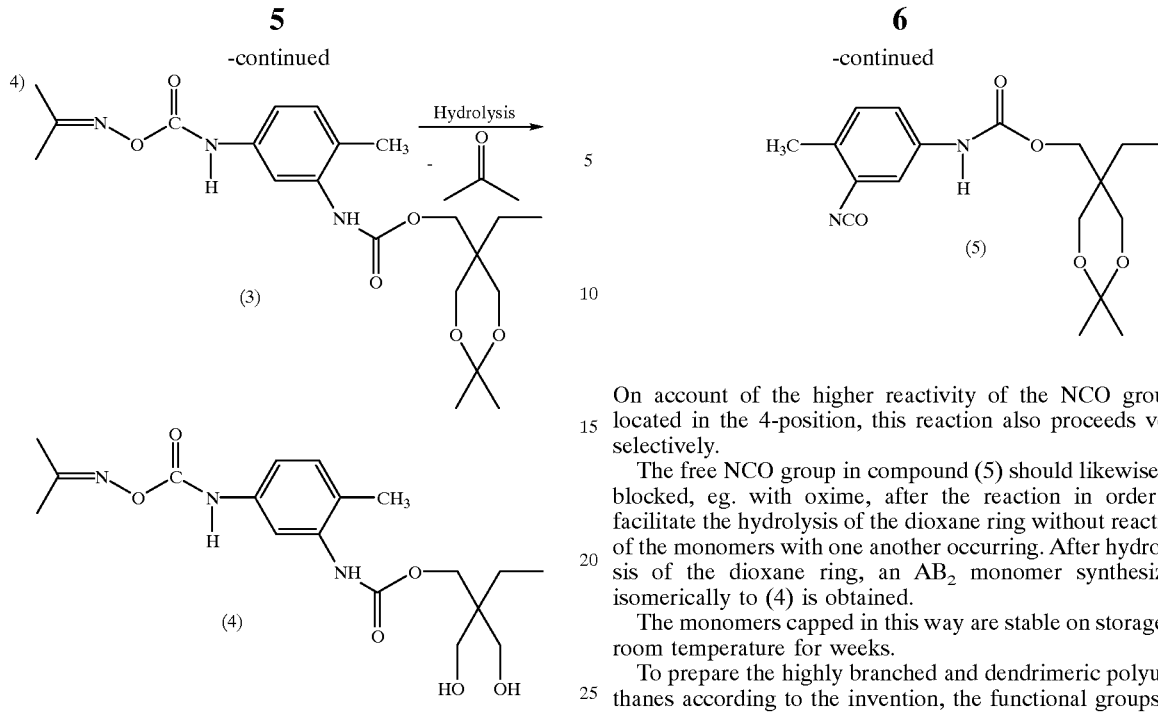

In the first step, the protected triol (1) is prepared from TMP and acetone, ie. 2 hydroxyl groups are capped. In the second step, where here first and second step is not to be interpreted as a chronological sequence, one NCO group of 2,4-TDI is blocked with acetone oxime and the monoisocyanate (2) results.

These two starting compounds are reacted to give a compound having 2 capped hydroxyl groups and a capped isocyanate group (3).

By hydrolysis, the hydroxyl groups can be made accessible again (4) and a monomer results which, after release of the isocyanate group, can be reacted to give highly branched or dendrimeric polyurethanes.

Alternatively to a capped trimethylolpropane, capped glycerol, N-hydroxyalkyloxazolidines or dialkanolamines can also be used. In the case of dialkanolamines, the NH group preferably reacts, so that capping of the OH groups can be dispensed with.

The reactions proceed in high selectivity.

An isomerically synthesized monomer can be obtained by reaction of acetone-capped TMP with 2,4-TDI.

The reaction proceeds according to the following equation:

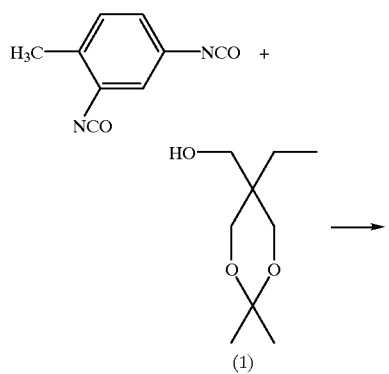

On account of the higher reactivity of the NCO groups located in the 4-position, this reaction also proceeds very selectively.

The free NCO group in compound (5) should likewise be blocked, eg. with oxime, after the reaction in order to facilitate the hydrolysis of the dioxane ring without reaction of the monomers with one another occurring. After hydrolysis of the dioxane ring, an $AB_2$ monomer synthesized isomerically to (4) is obtained.

The monomers capped in this way are stable on storage at room temperature for weeks.

To prepare the highly branched and dendrimeric polyurethanes according to the invention, the functional groups of the monomers are activated in order to make possible the reaction.

In the simplest case, the highly branched polyurethanes according to the invention can be prepared in a one-pot process. To do this, the functional groups of the monomer molecules are activated so that they can react with one another with the formation of urethane groups.

As the resulting oligomers or polymers are usually solid or highly viscous, it is advantageous to carry out the reaction in solution. Suitable solvents are the compounds customary for the preparation of polyurethane in solution, in particular acetone, methyl ethyl ketone, dimethylformamide, ethyl acetate, benzene, xylene, chlorobenzene, dichlorobenzene, chloroform, methylene chloride, (cyclo)aliphatics or toluene. To accelerate the reaction, the customary and known urethane formation catalysts, eg. organic tin compounds, can be employed.

The highly branched polyurethanes are medium to high viscosity liquids or solids. They can be separated from the solvent employed by precipitation and filtration or by distilling off the solvent. Removed capping agent which is possibly present in the solution is removed with the solvent. If necessary, the highly functional polyurethanes can be purified, for example by washing with solvent, by recrystallizing or by chromatography.

In the preparation of the dendrimeric polyurethanes according to the invention, the convergent and the divergent method are to be differentiated.

In the divergent method, starting from an initiator core, the monomers are added generation by generation around this.

In this process, it must be ensured by means of protective groups in the monomers that the monomers only react with the functional groups of the initiator core or of the dendrimer and not with one another.

In the convergent method, initially the individual branches are synthesized, which are then coupled onto an initiator core.

By way of example, it is intended to show the divergent synthesis of a dendrimer containing TMP as an initiator core and the monomer described above from TMP and 2,4-TDI with the aid of the structural formulae:

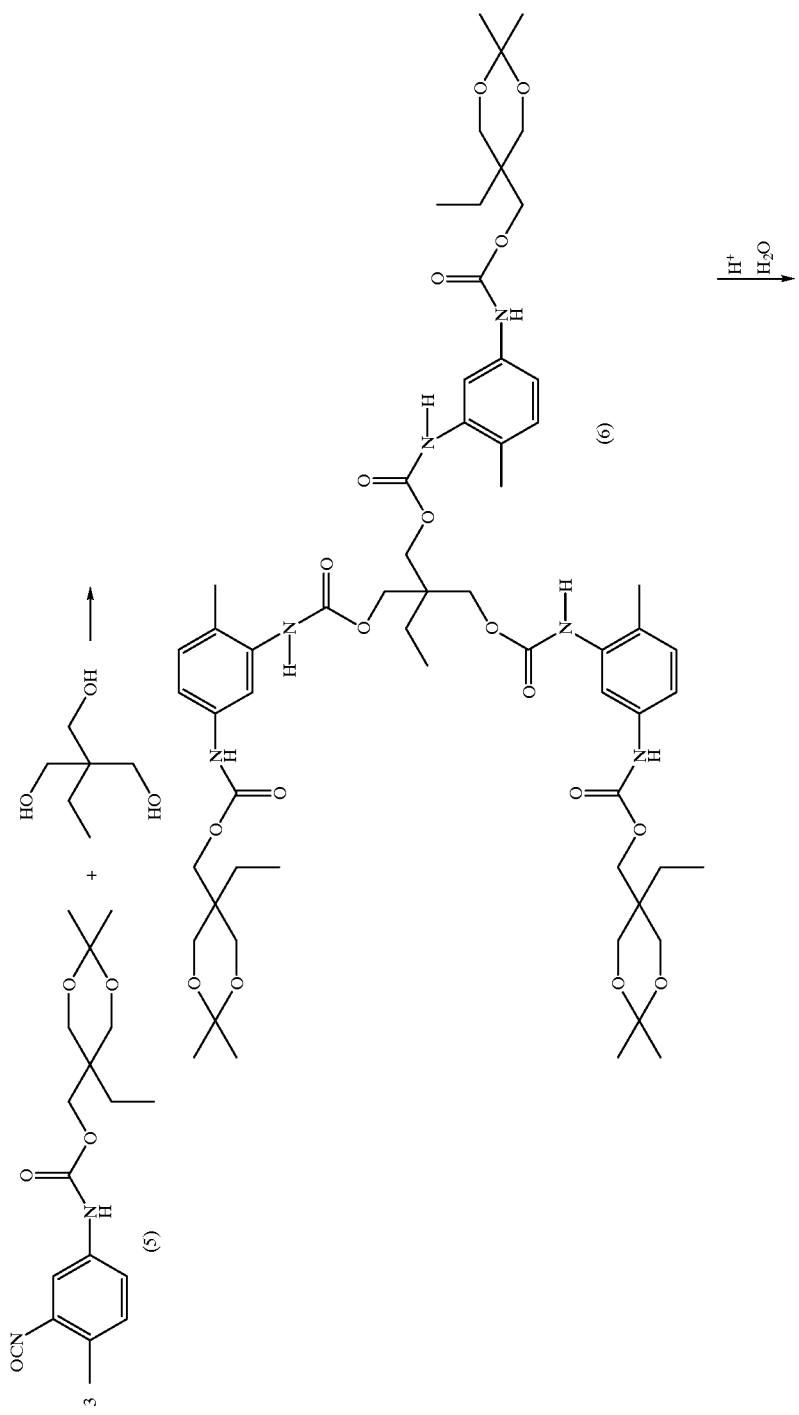

-continued
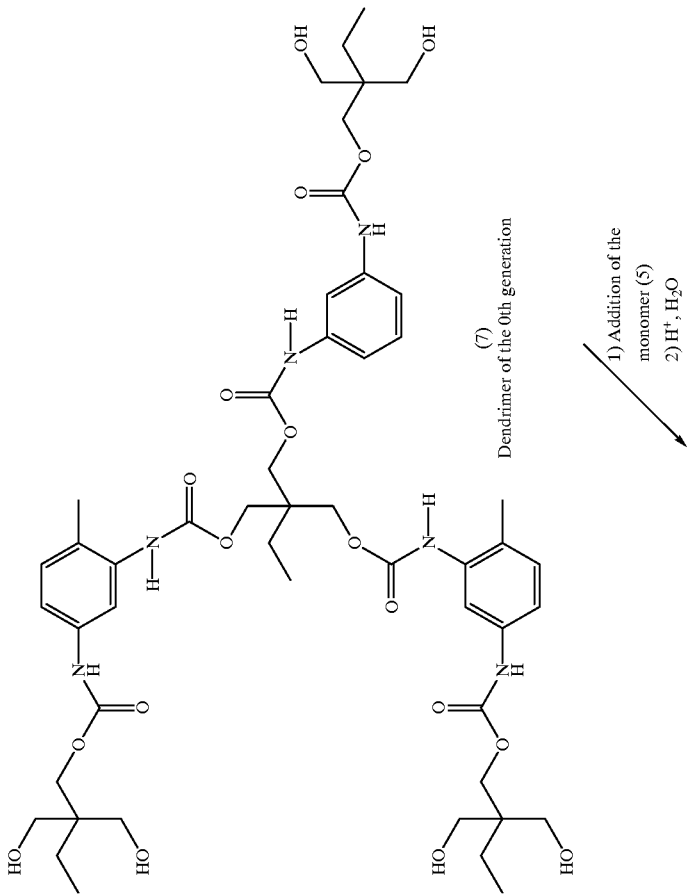

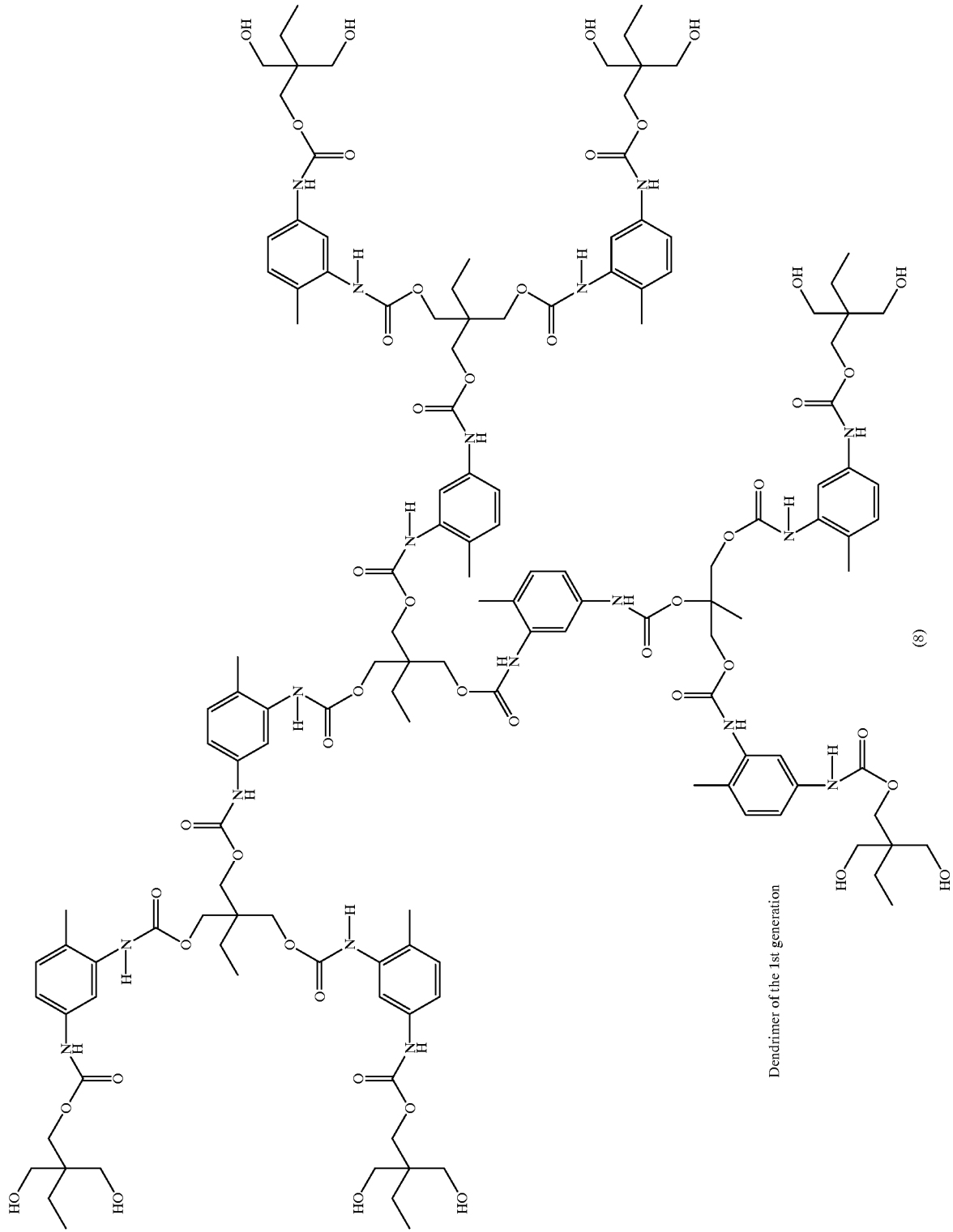

By means of addition of further monomers (5) to the free hydroxyl groups of the dendrimer, it is possible to synthesize further generations of the dendrimer. By means of the regular construction of the dendrimer molecules, the amount of monomer needed for the synthesis of each generation can be calculated exactly and employed for the synthesis.

To synthesize dendrimers having a defined structure, it is advantageous after the synthesis of each generation to isolate the reaction product, to purify it and to employ the product treated in this way for the synthesis of the next generation. The dendrimeric polyurethanes are advantageously prepared in solution, it being possible to employ the abovementioned solvents.

To accelerate the reaction, the abovementioned urethanization catalysts can be employed.

A convergent synthesis of dendrimeric polyurethanes, ie. a synthesis of the branches which are then added to an initiator core, is in principle possible in the same way.

When using the monomer described above, in a convergent synthesis of the dendrimeric polyurethane a monomer unit having two OH groups and a capped NCO group would be used as a starter molecule, for example molecule (4), and the monomer (5) grafted on generation by generation. The addition of the further monomers is carried out as described above. The branches synthesized in this way containing the blocked hydroxyl groups can be added to an H-functional initiator core after activation of the NCO group of the starting monomer. After the activation of the terminal hydroxyl groups, a dendrimer is formed which in its construction corresponds completely to the dendrimers prepared by the divergent process.

The preparation of monomers of the type $A(B)_n$, where A, B and n have the meaning described above, is, as emerges from the list of the isocyanates which can be used according to the invention, also possible with aliphatic isocyanates. By way of example, the preparation of a monomer of this type from 1,6-hexamethylene diisocyanate (HDI) and capped trimethylolpropane should be described here. As the reactivity of the two NCO groups of the HDI is identical, to prepare the monourethane an excess of capped alcohol should be used. The molar ratio of capped alcohol to the diisocyanate should be at least 1:3, in particular at least 1:5. Under these conditions, the reaction to give the monourethane proceeds in high selectivity and high yield. The unreacted diisocyanate can be removed from the reaction product in a simple way, for example by distillation.

Schematically, the preparation of such a monomer can be represented thus:

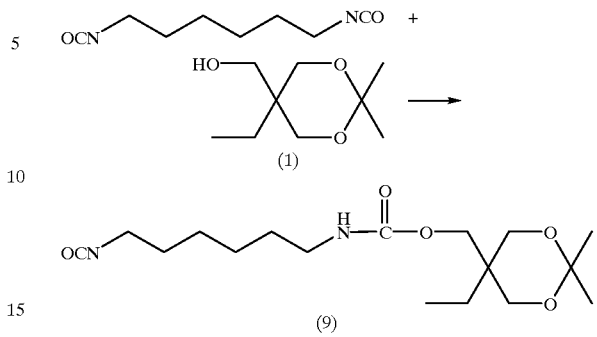

As shown in the case of the monomers based on TDI, this molecule can be coupled directly to an H-functional initiator core. After activation of the OH groups, a dendrimer of the 0th generation is thus obtained, to which the molecule (9) can in turn be added. Furthermore, by blocking the free NCO group and subsequently activating the hydroxyl groups a monomer can be prepared which can be reacted in the same way as described to give highly branched or dendrimeric polyurethanes.

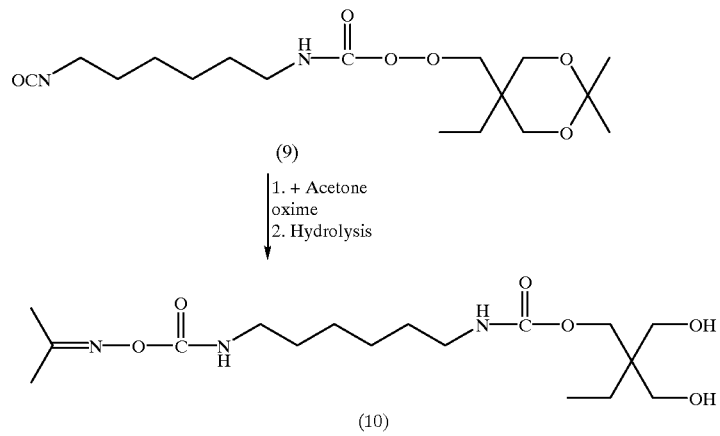

The highly branched and dendrimeric polyurethanes can be employed, for example, as highly functional crosslinkers for polyurethane lacquers and coatings or for polyurethane foams.

The invention is intended to be illustrated in greater detail by the following examples.

EXAMPLE 1

Preparation of Acetone-Capped Trimethylolpropane (Isopropylidene-TMP, (1))

250 g (1863 mmol) of trimethylolpropane were refluxed for 25 hours with 750 ml of acetone, 750 ml of petroleum ether 30/75 and 0.15 g of p-toluenesulfonic acid monohydrate. The water was then removed for 21 hours through a 50 cm packed column. The solution was then cooled to room temperature, 0.5 g of sodium methoxide was added and the mixture was stirred at room temperature for 1 hour. The solution was then filtered, excess solvent was stripped off in a rotary evaporator and the residue was distilled under reduced pressure through a 15 cm Vigreux column.

The reaction product was a colorless liquid having a boiling point of from 71 to 72° (0.5 mbar). The yield was 254 g =78%.

EXAMPLE 2
Preparation of the Monourethane from 2,4-TDI and Acetone Oxime (2)

232 g of 2,4-toluylene diisocyanate (1334 mmol) were initially introduced into 1330 ml of dried acetone under a nitrogen atmosphere. 48.7 g of acetone oxime (667 mmol) were dissolved in 450 ml of dried acetone and added dropwise to the reaction solution at room temperature in the course of 8 hours. The solution was allowed to stand overnight and evaporated in a rotary evaporator the next day. The resulting crystalline product was recrystallized in acetone and then washed with petroleum ether. A colorless solid having a melting point of from 109 to 111° C. resulted. The yield was 89.2 g (54%).

EXAMPLE 3
Preparation of the Monourethane from 2,4-TDI and Isopropylidene-TMP (5)

87.8 g (504 mmol) of 2,4-toluylene diisocyanate were initially introduced into 300 ml of petroleum ether 30/75. 44.0 g of the product from Example 1 were dissolved in 80 ml of petroleum ether 30/75 and added dropwise at room temperature in the course of 8 hours under a nitrogen atmosphere. The solution was allowed to stand at room temperature overnight and solid was filtered off with suction the next day. The residue was washed twice with petroleum ether and dried under reduced pressure. A colorless solid having a melting point of from 135 to 137° C. resulted. The yield was 81.2 g (92%).

EXAMPLE 4
Preparation of the diurethane from 2,4-TDI, Isopropylidene-TMP and Acetone Oxime (Isomer to (3))

30.0 g of the reaction product from Example 3 were dissolved in 500 ml of dried acetone. A solution of 6.29 g of acetone oxime in 100 ml of dried acetone was added dropwise to this in the course of 2 hours under a nitrogen atmosphere. The solution was then stirred at room temperature for 2 hours and subsequently evaporated at 35° C. in a rotary evaporator. The residue was washed with petroleum ether 30/75 and then dried under reduced pressure. A colorless solid resulted which melted on allowing it to stand for a fairly long time. The yield was 30.5 g (83%).

EXAMPLE 5
Preparation of the Diurethane from 2,4-TDI, Acetone Oxime and Isopropylidene-TMP (3)

20 g of the reaction product from Example 2 and 14.1 g of the reaction product from Example 1 were together added to 160 ml of dried acetone, 8 $\mu$l of di-n-butyltin dilaurate were added and the solution was stirred at 45° C. for 16 hours. After this, the IR spectrum no longer showed an NCO band. The solution was evaporated at 35° C. in a rotary evaporator and the residue triturated in petroleum ether 30/75. The resulting pasty mass was washed with petroleum ether 30/75 and then dried under reduced pressure. 26.9 g (=79%) of a colorless, hygroscopic solid resulted.

EXAMPLE 6
Preparation of the Urethanediol (4)

15.2 g of the reaction product from Example 5 were dissolved in 190 ml of methanol and 45 ml of water and 0.04 g of oxalic acid were added to this solution. The solution was stirred at room temperature for 72 h. The methanol was then stripped off from the solution in a rotary evaporator at 30° C. The aqueous residue was extracted with ethyl acetate, and the ethyl acetate phase was dried overnight using sodium sulfate and evaporated in a rotary evaporator. A yellowish solid having a melting point of from 53 to 55° C. resulted. The yield was 8.8 g (64%).

EXAMPLE 7
Preparation of the Urethanediol Isomeric to (4)

30.0 g of the product as described in Example 4 were dissolved in 80 ml of methanol and 20 ml of water and 0.09 g of oxalic acid were added to this solution. The solution was stirred at room temperature for 24 h. The methanol was then largely stripped off from the solution in a rotary evaporator at 30° C. The aqueous residue was extracted with ethyl acetate, and the ethyl acetate phase was dried overnight using sodium sulfate and evaporated in a rotary evaporator. A yellowish solid having a melting point of 54 to 56° C. resulted. The yield was 14.6 g (54%).

EXAMPLE 8
Preparation of the Urethanediol from 2,4-TDI, Acetone Oxime and Diethanolamine 6.37 g (60.6 mmol) of diethanolamine were dissolved in 100 ml of dried acetone. A solution of 15.0 g (60.6 mmol) of the reaction product from Example 2 in 120 ml of dried acetone were added dropwise to this at room temperature in the course of 2 h under a nitrogen atmosphere. The solution was stirred at room temperature for 1 h and allowed to stand overnight. It was then filtered, the solution was evaporated at 35° C. in a rotary evaporator and the residue was taken up in a little dry acetone. The resulting solution was covered with a little petroleum ether 30/75 and allowed to stand overnight at 30° C. The crystallized product was filtered off with suction and dried under reduced pressure. A colorless solid resulted; the yield was 9.6 g (45%).

EXAMPLE 9
Preparation of a Highly Branched Polyurethane from 2,4-TDI and TMP 9.5 g of the product from Example 6 were dissolved in 500 ml of methyl ethyl ketone and 25 $\mu$l of di-n-butyltin dilaurate were added. The solution was then heated to 80° C. and left at this temperature for 24 hours with stirring.

The resulting solid was filtered off with suction, washed with methyl ethyl ketone and dried under reduced pressure. GPC analysis using a polystyrene standard yielded the following characteristic values: $M_n$=431, $M_w$=1066, $M_w/M_n$=2.48.

EXAMPLE 10
Preparation of a Highly Branched Polyurethane from 2,4-TDI and TMP 19.0 g of the product from Example 7 were dissolved in 500 ml of monochlorobenzene. This solution was heated to 100° C. with stirring and left at this temperature for 3 hours.

The resulting solid was filtered off with suction, washed with monochlorobenzene and dried under reduced pressure. Characteristic values, determined by GPC analysis: $M_n$=568, $M_w$=1292, $M_w/M_n$=2.28.

EXAMPLE 11
Preparation of a Highly Branched Polyurethane from 2,4-TDI and Diethanolamine 8.8 g of the product from Example 8 were dissolved in 500 ml of methyl ethyl ketone. The solution was then heated to 80° C. and left at this temperature for 24 hours with stirring. The resulting solid was filtered off with suction, washed with methyl ethyl ketone and dried under reduced pressure. Characteristic values, determined by GPC analysis: $M_n$=1012, $M_w$=1983, $M_w/M_n$=1.96.

EXAMPLE 12
Preparation of a Dendrimer of the 0th Generation from 2,4-TDI and Isopropylidene-TMP (6)

20.0 g of the monourethane (5) from Example 3 were dissolved in 100 ml of dried acetone at 40° C., and 2.57 g of trimethylolpropane and 5 μl of di-n-butyltin dilaurate were added. The solution was refluxed for 6 h under a nitrogen atmosphere. An NCO band was then no longer present in the IR spectrum of the solution.

The solution was filtered before cooling and then evaporated at 45° C. in a rotary evaporator. The yellowish oil obtained was allowed to stand at room temperature overnight. It then became highly viscous and crystallized on triturating in petroleum ether 30/75. The solid was washed with petroleum ether 30/75 and dried under reduced pressure. 15.6 g of a colorless solid resulted.

EXAMPLE 13
Preparation of the Dendrimer of the 0th Generation from 2,4-TDI and TMP by activation of the OH group (7)

12 g of the product (6) from Example 12 were dissolved in 80 ml of methanol and 20 ml of water and 2 ml of 0.1-molar hydrochloric acid were added to this solution. The latter was allowed to stand at room temperature for 72 h, neutralized with sodium carbonate and filtered, and the methanol was then removed in a rotary evaporator at 30° C. The aqueous residue was extracted with ethyl acetate, and the ethyl acetate phase was dried over sodium sulfate and evaporated to dryness at 30° C. in a rotary evaporator. 5.4 g of a yellowish solid resulted.

EXAMPLE 14
Preparation of the Dendrimer of the 1st Generation from 2,4-TDI and TMP (8)

4.00 g of the reaction product (7) from Example 12 and 7.90 g of reaction product from Example 3 were dissolved together in 50 ml of dried acetone, 2.5 μl of di-n-butyltin dilaurate were added and the mixture was stirred at 50° C. for 4 h under a nitrogen atmosphere. An NCO band was then no longer present in the IR spectrum of the solution.

The solution was evaporated in a rotary evaporator at 35° C., the residue was taken up in 80 ml of methanol, 5 ml of water and 1 ml of 1 M hydrochloric acid were added and the solution was allowed to stand overnight at room temperature. An excess of sodium carbonate was then added, the solution was filtered and the methanol was removed at 30° C. in a rotary evaporator. The aqueous residue was extracted with ethyl acetate, and the ethyl acetate phase was dried over sodium sulfate and evaporated to dryness at 30° C. in a rotary evaporator. The reaction product was a yellowish solid. The yield was 5.8 g.

EXAMPLE 15
Preparation of the Dendrimer of the 2nd Generation from 2,4-TDI and TMP 4.00 g of reaction product from Example 14 and 5.75 g of reaction product from Example 3 were dissolved in 70 ml of acetone, 3.5 μl of di-n-butyltin dilaurate were added and the mixture was stirred at 50° C. for 3 h under a nitrogen atmosphere. An NCO band was then no longer present in the IR spectrum of the solution. The solution was evaporated to dryness at 35° C. in a rotary evaporator.

2.00 g of the residue were dissolved in 80 ml of methanol and 5 ml of water and 1 ml of 1 M hydrochloric acid were added. This solution was stirred at room temperature for 24 h. An excess of sodium carbonate was then added, the mixture was filtered and the methanol was removed in a rotary evaporator at 30° C.

The aqueous residue was extracted with ethyl acetate, and the ethyl acetate phase was dried over sodium sulfate and evaporated to dryness at 30° C. in a rotary evaporator. The reaction product was a yellowish solid The yield was 0.6 g.

EXAMPLE 16
Preparation of a Monourethane from HDI and Isopropylidene-TMP (9)

1680 g (10 mol) of HDI and 0.84 g of dibutyltin dilaurate were heated to 50° C. under nitrogen with stirring. 348 g of the reaction product from Example 1 were added dropwise at this temperature in the course of 30 minutes with stirring. After completion of the addition, the reaction mixture was left at this temperature for a further 30 minutes. The reaction mixture was then freed from the monomeric HDI by distillation in a thin-layer evaporator at 165° C. and 2.5 mbar.

The reaction product has the following characteristic values:
Purity: 88.6% (area % according to GPC)
NCO content: 12.3% by weight
Viscosity at 25° C.: 1200 mPa.s
Residual monomer content: <0.2% by weight.

EXAMPLE 17
Preparation of a Monourethane from HDI and isopropylideneglycerol The procedure was as in Example 16 only 264 g (2 mol) of isopropyldeneglycerol (Fluka AG) were added instead of the reaction product from Example 1.

The reaction product has the following characteristic values:
Purity: 89% (area % according to GPC)
NCO content: 13.7% by weight
Viscosity at 25° C.: 174 mPa.s
Residual monomer content: <0.2% by weight.

EXAMPLE 18
Preparation of the Diurethane from HDI, Isopropylidene-TMP and Acetone Oxime 100 g of the reaction product from Example 16 and 50 mg of dibutyltin dilaurate were initially introduced and the equimolar amount of acetone oxime, dissolved in dry acetone, were added dropwise at room temperature to this with stirring and under nitrogen in the course of 15 minutes, and after completion of the addition the mixture was stirred at room temperature for a further hour. The acetone was then removed on a rotary evaporator and the reaction product was purified by means of column chromatography on silica gel using ethyl acetate as eluent. The reaction product had a viscosity of 2140 mPa.s at 23° C.

EXAMPLE 19
Preparation of the Diurethane from HDI, Isopropylideneglycerol and Acetone Oxime The procedure was as in Example 18, only 100 g of reaction product from Example 17 were employed instead of the reaction product from Example 16.

EXAMPLE 20
Preparation of the Urethanediol (10)

20 g of the reaction product from Example 18 were initially introduced and a mixture of 100 ml of methanol, 20 ml of water and 15 ml of 0.1 molar hydrochloric acid were added to this. This mixture was stirred at 30° C. for 8 hours and allowed to stand over-night. It was then extracted three times by shaking with 50 ml each of ethyl acetate. The combined ethyl acetate extracts were washed with 20 ml of 0.1-molar sodium carbonate solution and then twice with 20 ml of water. After removing the aqueous phase, the organic phase was dried over sodium sulfate. After removing the ethyl acetate, the NCO-capped diol was obtained. Hydrolysis took place quantitatively.

Viscosity at 23° C.: 1070 mPa.s

EXAMPLE 21
Preparation of the Urethane Diol from HDI, Acetone Oxime and Glycerol The procedure was as in Example 20, only 20 g of the reaction product from Example 19 were employed instead of the reaction product from Example 18.

Viscosity at 23° C.: 4740 mPa.s

EXAMPLE 22
Highly Branched Polyurethane from HDI and Trimethylolpropane 100 g of the reaction product from Example 20 were treated with 100 mg of dibutyltin dilaurate and heated under nitrogen in a round-bottomed flask at 110° C.

A sample was taken every 2 hours and a gel permeation chromatography analysis was carried out. It was shown that the molar mass of the product increased continuously.

After heating for 10 hours, a product having a molar mass distribution and the following characteristic numbers was obtained:
Melting range: 45–50° C.
$M_n$: 872 g/mol
$M_w$: 1532 g/mol
$M_w/M_n$: 1.76

The product additionally contained 12.6 area % of the starting monomer.

EXAMPLE 23
Highly Branched Polyurethane from HDI and Glycerol

The procedure was as in Example 22, only 100 g of the reaction product from Example 21 were employed instead of the reaction product from Example 20.
Melting range: 48–52° C.
$M_n$: 830 g/mol
$M_w$: 1161 g/mol
$M_w/M_n$: 1.40

EXAMPLE 24
Preparation of a Dendrimer of the 0th Generation from HDI and Isopropylidene-TMP using TMP as Initiator Core 1 mol of the reaction product from Example 16 and 50 ml of dry methyl ethyl ketone were initially introduced and heated to 70° C. The solution of 0.3 mol of trimethylolpropane in 150 ml of methyl ethyl ketone was added with stirring and under nitrogen in the course of 15 minutes and the mixture was stirred further at 70° C. for 90 minutes.

The solvent was then removed on a rotary evaporator and the residue was chromatographed on silica gel using ethyl acetate as eluent.

A dendrimer of the 0th generation having capped hydroxyl groups and the following characteristic values resulted.

Viscosity 2140 mPa.s (50° C. in 10% by weight butyl acetate)
Elemental analysis: $C_{57}H_{104}O_{18}$
Calc.: C: 58.97; H: 8.97; N: 7.24
Found: C: 58.70; H: 9.18; N: 6.98

EXAMPLE 25
Preparation of a Dendrimer of the 0th Generation from HDI and TMP by Activation of the OH Groups 10 g of the reaction product from Example 24 were treated with 30 ml of methanol, 60 ml of water and 13 ml of 1-molar hydrochloric acid and the mixture was stirred under reflux for 8 hours. The methanol was then removed on a rotary evaporator, and the residue was taken up in 100 ml of methyl ethyl ketone and washed first with 15 ml of aqueous 1-molar sodium carbonate solution and then with 20 ml of water. After removal of the aqueous phase, the organic phase was dried using sodium carbonate.

After removal of the solvent, a hydroxyl-terminated dendrimer of the 0th generation resulted.

Viscosity 7110 mPa.S (at 50° C. in 10% by weight of methanol,
Elemental analysis: $C_{48}H_{92}N_6O_{18}$
Calc.: C: 55.37; H: :8.91; N: 8.07
Found: C: 55.30; H: 9.01; N: 7.80

We claim:

1. A process for preparing highly functionalized polyurethanes, which comprises adding, to an initiator core having at least 2 functional groups B', a molecule containing the functional groups $A(B)_n$ to each functional group B', where A is an NCO group or a group reactive with an NCO group, B and B' are an NCO group or a group reactive with an NCO group, A is reactive with B and B' and n is a positive number and is at least equal to 2, wherein the addition the functional groups B of the molecule to be added are converted into a form in which they cannot react with A, after the addition the functional groups B are again converted into the form reactive with A, in the same manner in turn a molecule containing the functional groups $A(B)_n$ is added to each reactive group B and the process is continued until the desired functionality is achieved or an addition of further molecules is no longer possible for steric or other reasons.

2. A process as claimed in claim 1, wherein B and B' are NCO groups.

3. A process as claimed in claim 2, wherein the NCO groups are converted by blocking into a form-in which they cannot react with the groups reactive with NCO groups.

4. A process as claimed in claim 3, wherein the blocking is carried out by uretdione formation.

5. A process as claimed in claim 3, wherein the blocking is carried out by means of oximes.

6. A process as claimed in claim 1, wherein the functional groups B and B' are groups reactive with NCO groups.

7. A process as claimed in claim 6, wherein the functional groups B and B' are amino groups.

8. A process as claimed in claim 6, wherein the functional groups B and B' are hydroxyl groups.

9. A process as claimed in claim 7, wherein, as initiator core, ammonia or an at least difunctional amine is employed.

10. A process as claimed in claim 8, wherein, as initiator core, an aliphatic, cycloaliphatic or aromatic diol, a triol, a tetrol or a sugar alcohol is employed.

11. A process as claimed in claim 1, wherein the functional groups B are H-functional groups.

12. A process as claimed in claim 11, wherein the functional groups B are amino groups.

13. A process as claimed in claim 11, wherein the functional groups B are hydroxyl groups.

14. A process as claimed in claim 13, wherein the blocking of the group B is carried out by ketalization or acetalization.

* * * * *

UNITED STATES PATENT AND TRADEMARK OFFICE
CERTIFICATE OF CORRECTION

PATENT NO.: 5,981,684

DATED: November 9, 1999

INVENTOR(S): BRUCHMANN et al.

It is certified that error appears in the above-identified patent and that said Letters Patent is hereby corrected as shown below:

Col. 20, claim 3, line 37, "form-in" should be --form in--.

Signed and Sealed this

Twenty-third Day of May, 2000

Attest:

Q. TODD DICKINSON

*Attesting Officer*   *Director of Patents and Trademarks*